(12) United States Patent (10) Patent No.: US 8,825,533 B2
Basson et al. (45) Date of Patent: Sep. 2, 2014

(54) INTELLIGENT DIALOGUE AMONGST COMPETITIVE USER APPLICATIONS

(75) Inventors: Sara H. Basson, White Plains, NY (US); Sasha P. Caskey, New York, NY (US); Dan Ning Jiang, Beijing (CN); Dimitri Kanevsky, Ossining, NY (US); Tara N. Sainath, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/363,727

(22) Filed: Feb. 1, 2012

(65) Prior Publication Data

US 2013/0198761 A1 Aug. 1, 2013

(51) Int. Cl.
*G06Q 30/00* (2012.01)

(52) U.S. Cl.
USPC .................... 705/26.64; 600/301; 600/302

(58) Field of Classification Search
CPC .................................................. G06Q 30/0629
USPC ................................ 705/26.64; 600/301, 306
See application file for complete search history.

(56) References Cited

U.S. PATENT DOCUMENTS

| | | | |
|---|---|---|---|
| 4,965,763 A | 10/1990 | Zamora | |
| 6,236,968 B1 | 5/2001 | Kanevsky et al. | |
| 6,246,985 B1 | 6/2001 | Kanevsky et al. | |
| 6,293,874 B1 * | 9/2001 | Armstrong | 472/51 |
| 6,421,453 B1 | 7/2002 | Kanevsky et al. | |
| 6,442,519 B1 | 8/2002 | Kanevsky et al. | |
| 6,505,208 B1 | 1/2003 | Kanevsky et al. | |
| 6,529,902 B1 | 3/2003 | Kanevsky et al. | |
| 6,665,644 B1 | 12/2003 | Kanevsky et al. | |
| 6,792,339 B2 | 9/2004 | Basson et al. | |
| 6,965,773 B2 | 11/2005 | Basson et al. | |
| 6,975,991 B2 | 12/2005 | Basson et al. | |
| 7,266,430 B2 | 9/2007 | Basson et al. | |
| 7,395,206 B1 | 7/2008 | Irwin et al. | |
| 7,702,607 B2 | 4/2010 | Torge et al. | |
| 7,706,548 B2 | 4/2010 | Kanevsky et al. | |
| 7,716,056 B2 | 5/2010 | Weng et al. | |
| 7,904,297 B2 | 3/2011 | Mirkovic et al. | |

(Continued)

FOREIGN PATENT DOCUMENTS

WO 2005062200 7/2005

OTHER PUBLICATIONS

Shimazu, H., "ExpertClerk: A Conversational Case-Based Reasoning Tool for Developing Salesclerk Agents in E-Commerce Webshops," (Dec. 2002) Artificial Intelligence Review, Issue 3-4, pp. 223-244 [retrieved from http://link.springer.com/article/10.1023/A:1020757023711#].*

(Continued)

*Primary Examiner* — Brian W Wathen
(74) *Attorney, Agent, or Firm* — Ryan, Mason & Lewis, LLP

(57) ABSTRACT

A method, an apparatus and an article of manufacture for enabling communication between at least two computer applications that is observable to a user. The method includes obtaining a description of functions for each of the at least two computer applications, comparing the description of functions for each of the at least two computer applications, generating a dialog between the at least two applications based on the comparing of the description of functions for each of the at least two computer applications, and making the dialog available to a user.

23 Claims, 4 Drawing Sheets

(56) References Cited

U.S. PATENT DOCUMENTS

| | | | |
|---|---|---|---|
| 7,937,463 B2 | 5/2011 | Chadli | |
| 8,199,734 B2 | 6/2012 | Sammarco | |
| 2002/0111791 A1 | 8/2002 | Candelore | |
| 2005/0010597 A1 | 1/2005 | Potter et al. | |
| 2005/0021600 A1 | 1/2005 | Lago Santo et al. | |
| 2005/0154264 A1* | 7/2005 | Lecompte et al. | 600/300 |
| 2005/0250552 A1 | 11/2005 | Eagle et al. | |
| 2007/0005643 A1 | 1/2007 | Korman | |
| 2007/0250841 A1 | 10/2007 | Scahill et al. | |
| 2008/0082479 A1* | 4/2008 | Chang et al. | 707/2 |
| 2008/0091546 A1* | 4/2008 | Kirovski et al. | 705/26 |
| 2008/0134058 A1 | 6/2008 | Shen et al. | |
| 2008/0222402 A1* | 9/2008 | Connors et al. | 713/1 |
| 2008/0248784 A1 | 10/2008 | Pan | |
| 2009/0059786 A1 | 3/2009 | Budampati et al. | |
| 2009/0099940 A1* | 4/2009 | Frederick et al. | 705/26 |
| 2009/0195392 A1* | 8/2009 | Zalewski | 340/573.1 |
| 2010/0022852 A1* | 1/2010 | Westerink et al. | 600/301 |
| 2010/0083225 A1 | 4/2010 | Giat | |
| 2010/0086204 A1* | 4/2010 | Lessing | 382/165 |
| 2010/0165947 A1 | 7/2010 | Taniuchi et al. | |
| 2010/0169073 A1 | 7/2010 | Almagro | |
| 2010/0174813 A1 | 7/2010 | Hildreth et al. | |
| 2010/0185434 A1 | 7/2010 | Burvall et al. | |
| 2010/0199228 A1* | 8/2010 | Latta et al. | 715/863 |
| 2010/0328078 A1 | 12/2010 | Light et al. | |
| 2011/0023023 A1 | 1/2011 | Chatterjee | |
| 2011/0113086 A1 | 5/2011 | Long et al. | |
| 2011/0172999 A1 | 7/2011 | Hakkani-Tur et al. | |
| 2011/0178803 A1 | 7/2011 | Petrushin | |
| 2011/0179180 A1 | 7/2011 | Schleifer et al. | |
| 2011/0295856 A1 | 12/2011 | Roitblat et al. | |
| 2011/0307380 A1 | 12/2011 | Ido | |
| 2012/0029308 A1* | 2/2012 | Paquet | 600/301 |
| 2012/0047483 A1* | 2/2012 | Amit et al. | 717/104 |
| 2012/0072451 A1* | 3/2012 | Merrifield et al. | 707/771 |
| 2012/0115501 A1 | 5/2012 | Zheng | |
| 2013/0173431 A1* | 7/2013 | Nations et al. | 705/26.64 |

OTHER PUBLICATIONS

André, E.; Rist, T., "Presenting Through Performing: On the Use of Multiple Lifelike Characters in Knowledge-Based Presentation Systems," (Mar. 2001) Knowledge-Based Systems, vol. 14, Issues 1-2, pp. 3-13 [retrieved from http://www.sciencedirect.com/science/article/pii/S0950705100000964].*

Dictionary.com. Dictionary.com Unabridged. Random House, Inc. http://dictionary.reference.com/browse/compendium (accessed: Aug. 15, 2013).*

Nudd, T., "Apple's 'Get a Mac,' the Complete Campaign Hodgman and Long, Ad Characters for the Ages" (Apr. 13, 2011) [retrieved from http://www.adweek.com/adfreak/apples-get-mac-complete-campaign-130552].*

Dictionary.com. Dictionary.com Unabridged. Random House, Inc. http://dictionary.reference.com/browse/summary (accessed: Aug. 15, 2013).*

Chai, J.; Horvath, V.; Nicolov, N.; Stys-Budzikowska, M; Kambhatla, N.; Zadrozny, W., "Natural Language Sales Assistant—A Web-based Dialog System for Online Sales," (2001) Proceedings of IAAI-01, pp. 1-8 [retrieved from http://www.aaai.org/Papers/IAAI/2001/IAAI01-003.pdf].*

Chai, J.; Horvath, V.; Nicolov, N.; Stys-Budzikowska, M; Kambhatla, N.; Zadrozny, W., "A Conversational Interface for Online Shopping," (2001) Proceedings of the first international conference on Human language technology research, pp. 1-4 [retrieved from http://dl.acm.org/citation.cfm?id=1072145].*

Bartenstein, O., "DialogEngines—Dialog Agents for Web-Based Self Service Consulting," (2005), Applications of Declarative Programming and Knowledge Management Lecture Notes in Computer Science, vol. 3392, pp. 269-277 [retrieved from http://link.springer.com/chapter/10.1007/11415763_18#].*

Merriam-Webster's Collegiate Dictionary, $10^{th}$ Ed. (1999), p. 877.*

Prendinger, H.; Ishizuka, M., "The Empathic Companion: A Character-Based Interface That Addresses Users' Affective States," (2005), Applied Artificial Intelligence, vol. 19, Iss. 3-4, pp. 267-285 retrieved from http://www.miv.t.u-tokyo.ac.jp/papers/helmut-JAppliedAI05.pdf.*

Lee et al., Implementation of Dialogue System for Intelligent Services Robots, International Conference on Control, Automation and Systems 2008, Oct. 14-17 2008 in COEX, Seoul, Korea, pp. 2038-2042.

Li et al., A Dialog System for Comparative User Studies on Robot Verbal Behavior, the 15th IEEE International Symposium on Robot and Human Interactive Communication (RO-MAN06), Hatfield, UK, Sep. 6-8, 2006, pp. 129-134.

Natural Language Generation, http://en.wikipedia.org/wiki/Natural_language_generation, pp. 1-5, downloaded Feb. 1, 2012.

Natural Language Understanding, http://en.wikipedia.org/wiki/Natural_language_understanding, pp. 1-4, downloaded Feb. 1, 2012.

Sony Emotion Detector, http://www.bit-tech.net/news/gaming/2009/08/17/sony-patents-ps3-emotion-detector/1, pp. 1-3, downloaded Feb. 1, 2012.

* cited by examiner

INTELLIGENT DIALOGUE AMONGST COMPETITIVE USER APPLICATIONS

CROSS-REFERENCE TO RELATED APPLICATIONS

The present application is related to U.S. patent application entitled "Virtual Communication Techniques," identified by Ser. No. 13/030,268 and filed on Feb. 18, 2011, the disclosure of which is incorporated by reference herein in its entirety.

FIELD OF THE INVENTION

Embodiments of the invention generally relate to information technology, and, more particularly, to dialogue systems.

BACKGROUND

Users often choose between different competitive applications when using his/her computer. For example, a user can choose what search engine to use or what messenger to use. Additionally, sometimes, when a user installs certain applications, the application suggests to the user that another application may be eliminated or suppressed in some ways. If the user agrees to the noted application elimination/suppression, a message may be presented that informs the user that an application is attempting to remove/suppress the relevant application and asks the user to confirm this decision.

Such a setting does not allow users to choose between competitive options, and users may not be aware of advantages and disadvantages of different competitive applications.

SUMMARY

In one aspect of the present invention, techniques for intelligent dialogue amongst competitive user applications are provided. An exemplary computer-implemented method for enabling communication between at least two computer applications that is observable to a user can include steps of obtaining a description of functions for each of the at least two computer applications, comparing the description of functions for each of the at least two computer applications, generating a dialog between the at least two applications based on the comparing of the description of functions for each of the at least two computer applications, and making the dialog available to a user.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
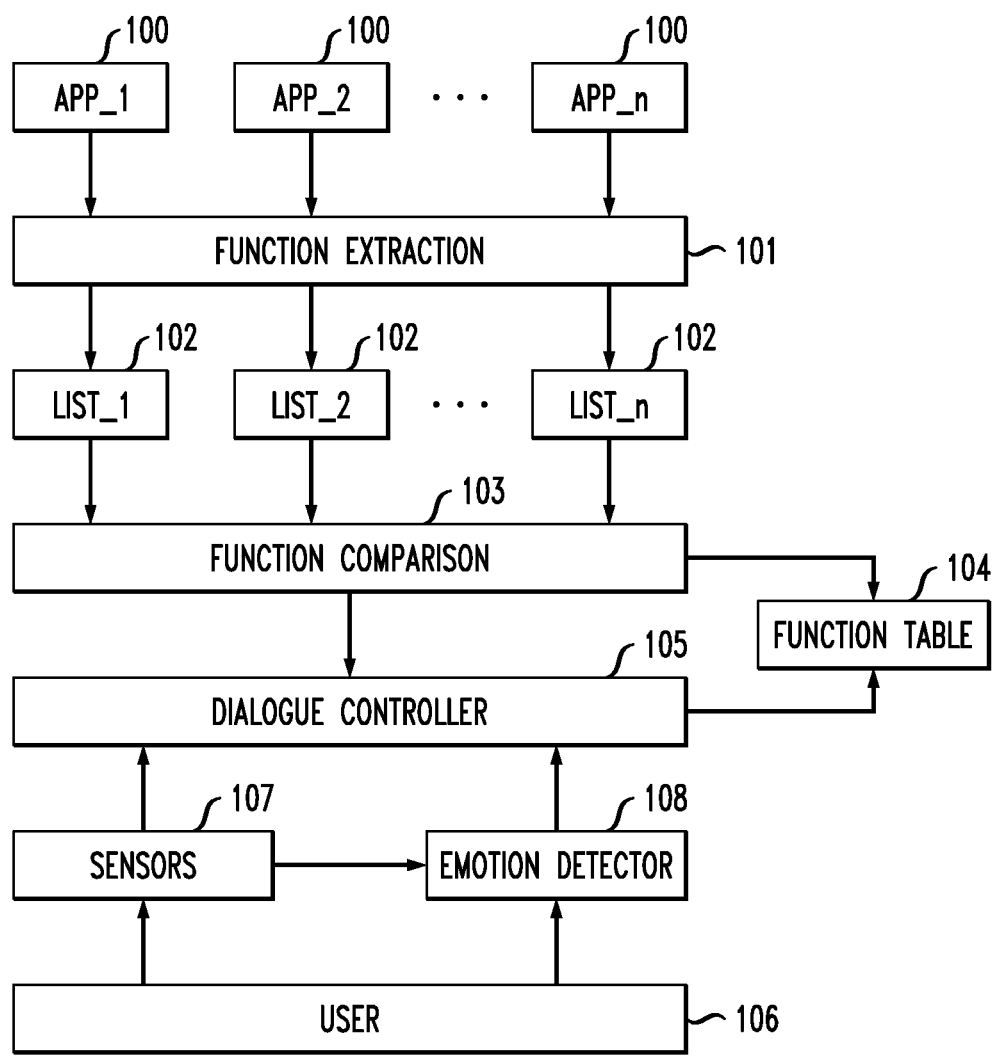
FIG. 1 is a diagram illustrating system components, according to an embodiment of the present invention.

As described herein, an aspect of the present invention includes an intelligent dialogue system for competitive user applications. An example embodiment of the invention includes a comparative application dialogue system (CADS) enabling different applications to have a dialogue that is observed by a user. In such a dialogue, avatars that represent respective applications ask each other questions about each other's system properties and explain advantages of their respective application. The user can view the conclusion of the dialogue between the two systems and/or watch the dialogue and ultimately decide which application to choose.

An example of such dialogue between a first user application (App1) and a second user application (App2) can include the following:

App1: Can you provide chat capabilities between many users?

App2: Yes, I can. Can you provide calling capabilities between users?

App1: I cannot but do you have search capabilities to search a desktop?

App2: I do not have search capabilities, but does the user need your application to provide search capabilities, or can the user have search capabilities without your application?

In an illustrative embodiment of the invention, the user would be presented with a table summarizing the results upon conclusion of the dialogue. For example, a summary table of the above dialogue may appear as follows:

|  | App2 | App1 | Popularity |
| --- | --- | --- | --- |
| Multi-user chat | yes | yes | *** |
| Voice calls | yes | no | **½ |
| Search desktop | no | yes | * |

In order for products to participate in the CADS system of an example embodiment of the invention, the products must make available a description $X\_i$ of the product $Y\_i$ in some format. Making dialog information available to a user can also include rendering the dialog in a user-discernible format.

By way of example, some sentences in a product description are tagged (that is, labeled), giving a high level description of a content. For instance, a product description of chat capabilities can be described as:

Click on an options button "add users" in a menu to add new users that can join to a conversation.

Also, this can be tagged as:

```
OPERATE<name1> OBJECT<name2>
ACTION<name3> ATTRIBUTE<name4>
CATEGORY<name5>
Here:    name1 = click
         name2 = options
         name3 = add
         name4 = new user
         category = can join
```

Additionally, OPERATE can have other names such as "open" or "move." Name2 can include things such as button, or windows, or file, etc. Therefore, OPERATE OBJECT can cover possible text utterances that describe product descriptions that are related to performing some actions on some objects. Such tags allow the construction of a dialog that is based on the following:

Can your product allow ATTRIBUTE CATEGORY?

Substituting into formal symbols utterances from a textual description would give the following:

Can your product to allow join new users?

These descriptions can be submitted to the CADS system, which, in accordance with at least one embodiment of the invention, will generate the dialogue between systems, correlate the dialogue with any meta data available (for example, user feedback) and provide the user with a summary as well as the full dialogue. If a product does not provide a description, the CADS system can, in at least one embodiment of the invention, attempt to infer a description from available meta data.

An aspect of the invention additionally allows for the CADS system to be networked. This allows users to view which applications are preferred over others based on considerations such as past history, etc. Accordingly, the CADS component can obtain and display application preference information to a user. Further, conflict resolutions can be categorized based on area, language, culture, etc. to cater to specific demographics of people.

In accordance with at least one embodiment of the invention, users have the ability to participate in the dialogue to influence the final decision or general direction of the conversation between the applications. In some instances, applications can opt to work together to defeat another competing application, thus forming cooperation between them.

This can be accomplished if different applications have access to descriptions of each other's products and the different applications can build a dialog together that is synchronized to support each other's application and criticize a completive application. For example, a chat system can say that it allows a search by using some search application, and then this search application states that another chat is not compatible with this search application in some way.

In order to understand that some applications can collaborate, applications can use analyses of their product descriptions and make decisions on whether they compete or can collaborate. If they decide that they can collaborate, the applications can share their tags that allow associations with their product description dialogues.

The techniques detailed herein provide a capability for at least two different computer applications to communicate (for example, residing on different machines), and can include the use of at least one processor, a CADS component executable by the processor, and at least two different computer applications each having a description $X\_i$ of their product $Y\_i$ in some format. The CADS component is adapted to obtain a description $X\_i$ of their product $Y\_i$ in some format for each application, generate a dialog between the applications, and generate dialog information available to a user.

At least one embodiment of the invention can additionally include at least one rendering device for rendering dialog information to a user. A rendering device can include, for example, an audio component, a visual display component, as well as a communication component for connecting the CADS component to a network.

As also described herein, a comparative application dialogue system (CADS) of at least one embodiment of the invention is used to facilitate machines to carry out a discussion between themselves by speaking (that is, producing communication messages that humans can hear). The communication can occur within the CADS system as a debate, where a machine presents certain points about their algorithm, and another machine understands the content of the debate and presents a counter argument. Also, in additional embodiments of the invention, machines can have individual semantic processing systems and can produce messages that a human understands but that another machine does not understand.

FIG. 1 is a diagram illustrating system components, according to an embodiment the present invention. By way of illustration, FIG. 1 depicts blocks 100, which represent competitive applications in a user's computer. Block 101 represents a function extraction system, which summarizes main functions from the applications' user manual and other documents, and outputs a function list for each application, represented by blocks 102. Block 103 represents a function comparison module, which compares the function list of each application and summarizes the functions in a function table, represented by block 104. A function table summarizes the functions of every application, for example, with a format as follows:

|       | func_1 | func_2 | ... | func_n |
|-------|--------|--------|-----|--------|
| app_1 | yes    | yes    | ... | no     |
| app_2 | no     | yes    | ... | no     |
| ...   | ...    | ...    | ... | ...    |
| app_n | no     | yes    | ... | yes    |

Block 105 represents a dialogue controller, which generates debates in a natural language for the applications based on the function table and user inputs, and outputs the final summarization table (also represented by block 104) according to the dialogue. Block 106 represents a user of the computer and applications who interacts with the machine via natural language. His/her attitude and emotion status about the current dialogue can be also captured and analyzed by sensors (block 107) and emotion detector (block 108). Block 107 represents these sensors that capture user parameters and current status. For example, a camera can be used to capture the user's gestures and facial expressions, a microphone can be used for voice input, and additional sensors can be used to detect physical data such as temperature, blood pressure, electric conductivity of the skin, etc. Further, block 108 represents an emotion detector to analyze the user's emotion and attitude status based on signal streams captured by the sensors.

Figure 2:
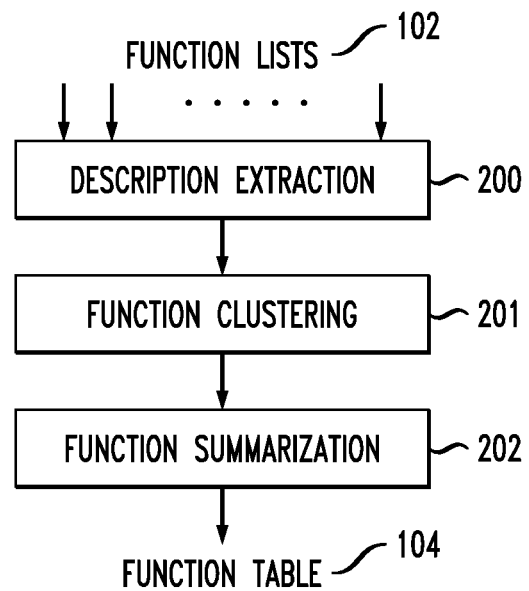
FIG. 2 is a diagram illustrating components for function comparison, according to an embodiment of the present invention.

FIG. 2 is a diagram illustrating components for function comparison, according to an embodiment of the present invention. By way of illustration, FIG. 2 depicts sub-components of the function comparison module depicted as component 103 in FIG. 1. As noted, function lists 102 are provided as input. Additionally, block 200 represents a description extraction module, which extracts relevant descriptions from user documents for each function of the applications. Block 201 represents a function clustering module, which clusters similar functions across the applications. Also, block 202 represents a function summarization module, which summarizes the clustered function and generates the function table (such as depicted by component 104 in FIG. 1).

Figure 3:
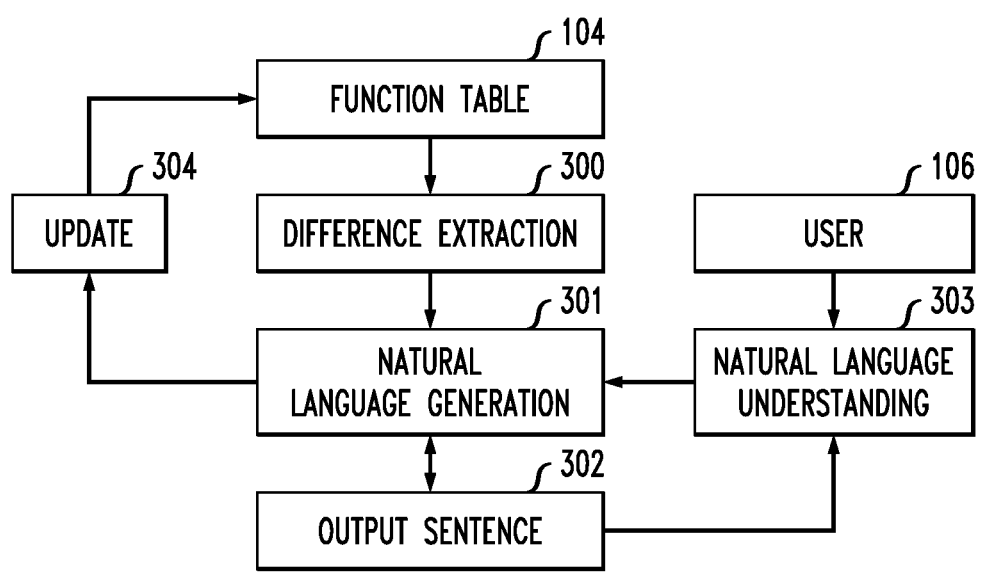
FIG. 3 is a diagram illustrating components of a dialogue controller module, according to an embodiment of the present invention.

FIG. 3 is a diagram illustrating components of a dialogue controller module (such as depicted as block 105 in FIG. 1), according to an embodiment of the present invention. By way of illustration, FIG. 3 depicts block 300, which represents a difference extraction module, which finds a difference between a pair of applications according to the function table 104, and outputs the difference to a natural language generation module 301 to one the applications. Natural language generation module 301 produces one sentence for the application according to three inputs: the function difference between a pair of applications input by difference extraction module 300, the previously generated output sentence 302, and user inputs (sentence and emotion status).

Accordingly, block 302 represents the sentence output by the natural language generation module 301, in formats such as the following:

App_i to app_j: the sentence
App_i to user: the sentence

Block 303 represents a natural language understanding module, which analyzes the user's sentence (for example, from user 106), extracts the meaning and inputs it to natural language generation module 301. Further, block 304 represents an update to the function table according to the current dialogue status.

Figure 4:
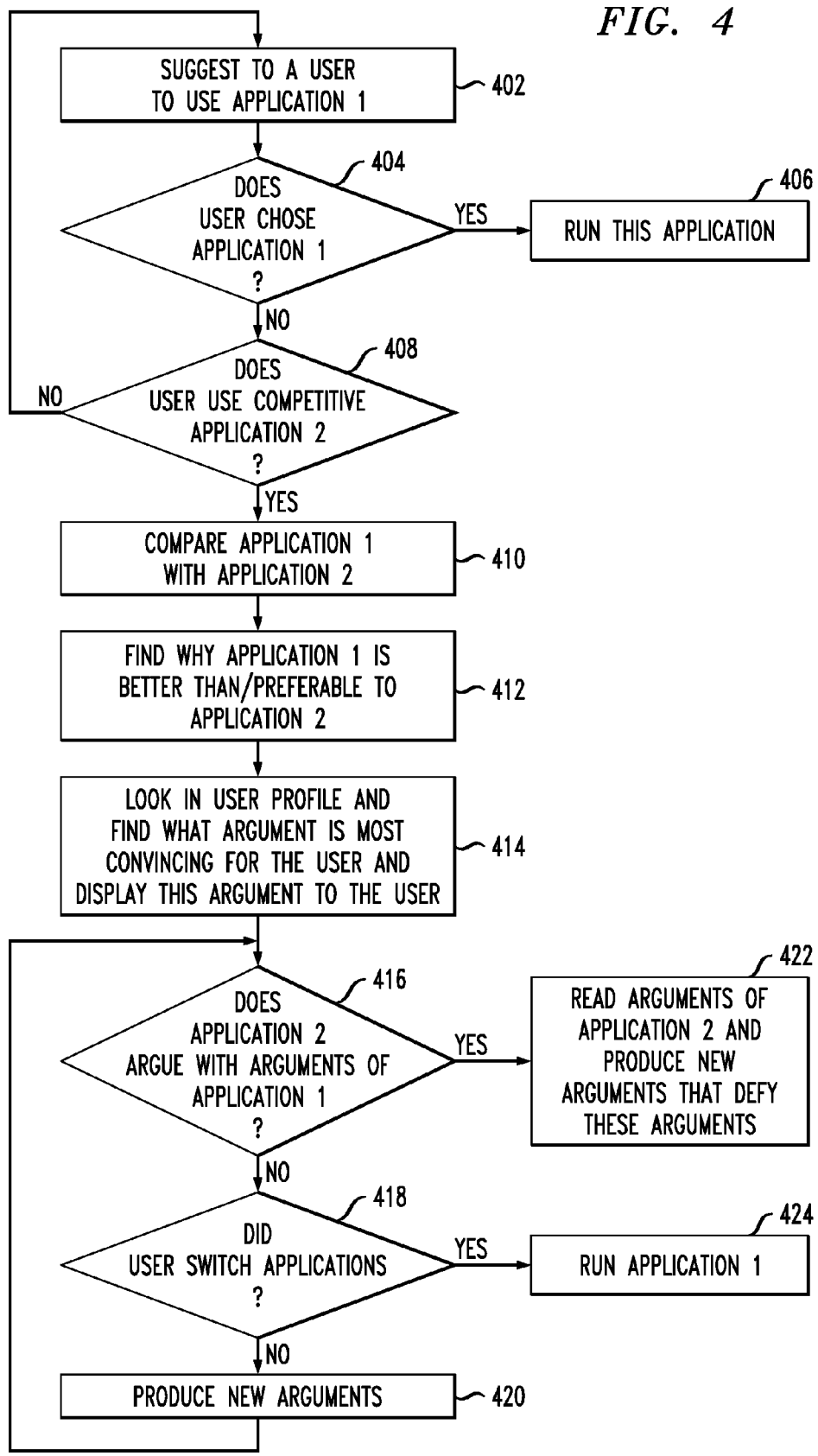
FIG. 4 is a flow diagram, according to an embodiment of the present invention.

FIG. 4 is a flow diagram, according to an embodiment of the present invention. Step 402 includes suggesting to a user to use an application (application 1). Step 404 includes determining if the user chose application 1. If yes (that is, the user chose application 1), step 406 includes running the application. If no (that is, the user did not chose application 1), step 408 includes determining whether the uses is using a competitive application (application 2). If no (that is, the user is not using competitive application 2), step 402 can be re-visited. If yes, (that is, the user is using competitive application 2), step 410 includes comparing application 1 with application 2.

Further, step 412 includes determining why application 1 is better than or preferable to application 2. Step 414 includes looking in a user profile to find what argument(s) is most convincing for the user and displaying this argument to the user. Step 416 includes determining whether application 2 argues with the arguments of application 1 (from step 414). If yes (that is, application 2 argues with the arguments of application 1), step 422 includes reading the arguments of application 2 and producing new arguments that counter or defy these application 2 arguments (and then re-visiting step 416). If no (that is, application 2 does not argue with the arguments of application 1), step 418 includes determining if the user switched applications. If yes (that is, the user switched to application 1), step 424 includes running application 1. If no (that is, the user did not switch to application 1), step 420 includes producing new arguments.

Figure 5:
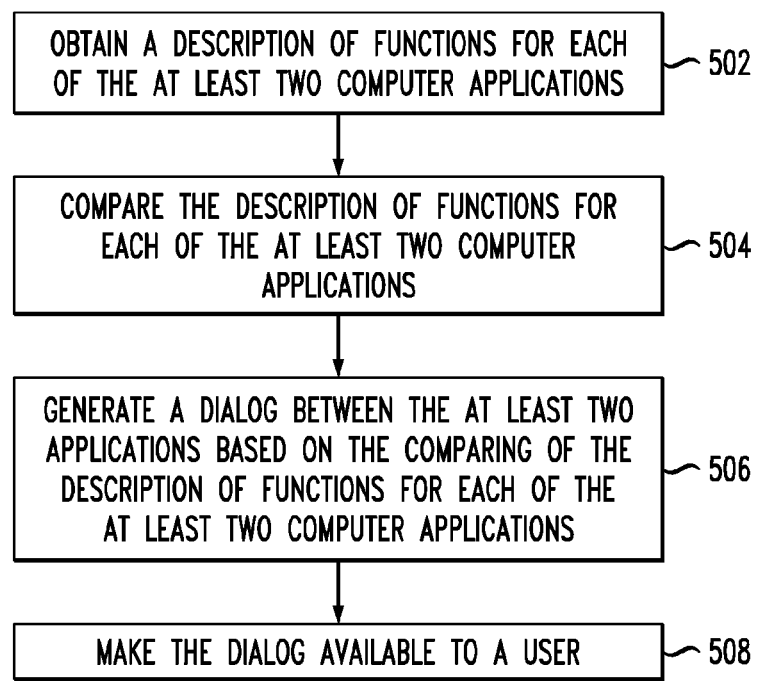
FIG. 5 is a flow diagram illustrating techniques for enabling communication between at least two computer applications that is observable to a user, according to an embodiment of the invention.

FIG. 5 is a flow diagram illustrating techniques for enabling communication between at least two computer applications that is observable to a user, according to an embodiment of the present invention. In at least one embodiment of the invention, the at least two computer applications reside on different machines. Step 502 includes obtaining a description of functions for each of the at least two computer applications. Obtaining a description of functions for each of the computer applications can include inferring the description from available metadata pertaining to an application.

Step 504 includes comparing the description of functions for each of the at least two computer applications. Comparing the description of functions for the computer applications includes extracting at least one description from a user document for each function of the computer applications. An embodiment of the invention can additionally include clustering two or more similar functions across the at least two computer applications, summarizing the clustered functions and generating a function table.

Step 506 includes generating a dialog between the at least two applications based on the comparing of the description of functions for each of the at least two computer applications. In at least one embodiment of the invention, the dialog is generated in a natural language. Generating a dialog between the applications based on the comparing of the description of functions can include determining a function difference between the computer applications according to the description of functions, and outputting the function difference to a natural language generation module to produce a sentence for one of the at least two computer applications. As detailed herein, producing a sentence for one of the computer applications can be based on the determined function difference, a previously generated sentence for a different one of the at least two computer applications, and/or a user input. Further, user input can include data pertaining to a physical parameter of the user perceived by a sensor and/or data pertaining to a non-physical parameter of the user perceived by a sensor.

Step 508 includes making the dialog available to a user. Making the dialog available to a user can include generating a dialog summary. Additionally, making the dialog available to a user can include rendering the dialog in a user-discernible format (for example, audio, text, graphical or an audio-visual display).

The techniques depicted in FIG. 5 can additionally include updating the description of functions according to a dialogue. An aspect of the invention can also include augmenting the dialog with metadata, such as, for example, metadata that represent semantic, syntax, formal actions, etc. Further, the techniques depicted in FIG. 5 can include enabling a user to select one of the at least two computer applications based on the dialog. Additionally, an embodiment of the invention can include displaying application preference information to a user.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules, such as those depicted in FIGS. 1-4, can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer usable program code that is stored in a computer readable storage medium in a data processing system, and wherein the computer usable program code was downloaded over a network from a remote data processing system. Also, in an aspect of the invention, the computer program product can include computer usable program code that is stored in a computer readable storage medium in a server data processing system, and wherein the computer usable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
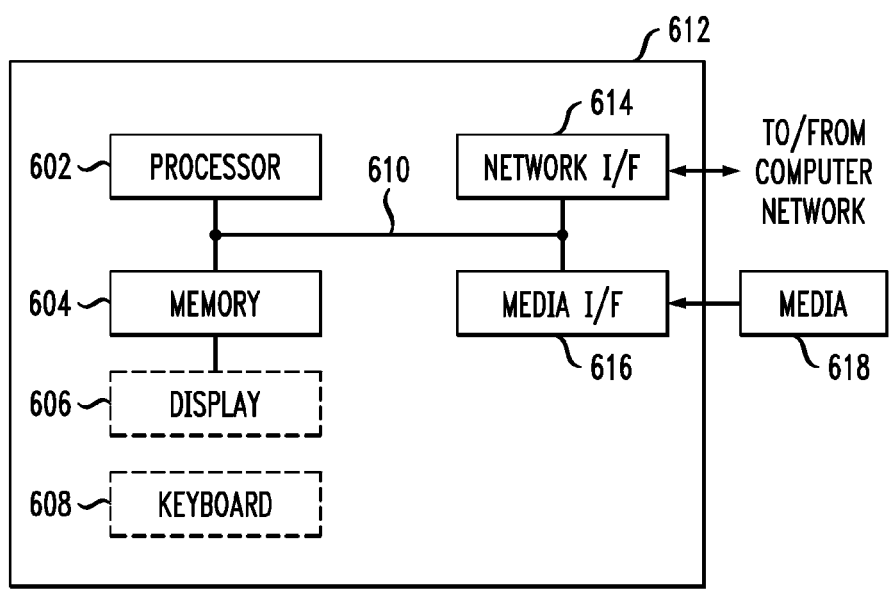
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, providing a comparative application dialogue system to enable different applications to have a dialogue that is observed by a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining a description of functions for each of the at least two computer applications;
comparing the description of functions for each of the at least two computer applications;
generating a dialog between avatars representing the at least two applications based on (i) the comparing of the description of functions for each of the at least two computer applications, and (ii) a user input comprising data pertaining to a physical parameter of the user perceived by a sensor, wherein the physical parameter comprises at least one of user body temperature, user blood pressure, and electric conductivity of user skin; and
making the dialog available to a user;
wherein at least one of the steps is carried out by a computer device.

2. The method of claim 1, wherein the dialog is generated in a natural language.

3. The method of claim 1, wherein comparing the description of functions for each of the at least two computer applications comprises extracting at least one description from a user document for each function of the at least two computer applications.

4. The method of claim 3, further comprising:
clustering two or more similar functions across the at least two computer applications.

5. The method of claim 4, further comprising:
summarizing the clustered functions; and
generating a function table.

6. The method of claim 1, wherein generating a dialog between avatars representing the at least two applications based on the comparing of the description of functions for each of the at least two computer applications comprises:
determining a function difference between the at least two computer applications according to the description of functions; and
outputting the function difference to a natural language generation module to produce a sentence for one of the at least two computer applications.

7. The method of claim 6, wherein producing a sentence for one of the at least two computer applications is based on the determined function difference.

8. The method of claim 6, wherein producing a sentence for one of the at least two computer applications is based on a previously generated sentence for a different one of the at least two computer applications.

9. The method of claim 6, wherein producing a sentence for one of the at least two computer applications is based on a user input.

10. The method of claim 1, further comprising:
updating the description of functions according to a dialogue.

11. The method of claim 1, wherein making the dialog available to a user comprises generating a dialog summary.

12. The method of claim 1 wherein making the dialog available to a user comprises rendering the dialog in a user-discernible format.

13. The method of claim 1, further comprising augmenting the dialog with metadata.

14. The method of claim 1, wherein obtaining a description of functions for each of the at least two computer applications comprises inferring the description from available metadata pertaining to an application.

15. The method of claim 1, further comprising:
enabling a user to select one of the at least two computer applications based on the dialog.

16. The method of claim 1, further comprising:
displaying application preference information to a user.

17. The method of claim 1, wherein the at least two computer applications reside on different machines.

18. An article of manufacture comprising a computer readable storage memory device having computer readable instructions tangibly embodied thereon which, when implemented, cause a computer to carry out a plurality of method steps comprising:
obtaining a description of functions for each of the at least two computer applications;
comparing the description of functions for each of the at least two computer applications;
generating a dialog between avatars representing the at least two applications based on (i) the comparing of the description of functions for each of the at least two computer applications, and (ii) a user input comprising data pertaining to a physical parameter of the user perceived by a sensor, wherein the physical parameter comprises at least one of user body temperature, user blood pressure, and electric conductivity of user skin; and
making the dialog available to a user.

19. The article of manufacture of claim 18, wherein generating a dialog between avatars representing the at least two applications based on the comparing of the description of functions for each of the at least two computer applications comprises:
determining a function difference between the at least two computer applications according to the description of functions; and
outputting the function difference to a natural language generation module to produce a sentence for one of the at least two computer applications.

20. The article of manufacture of claim 18, wherein making the dialog available to a user comprises rendering the dialog in a user-discernible format.

21. A system comprising:
a memory; and
at least one processor coupled to the memory, the memory storing instructions that when executed by the processor perform the operations of:
obtaining a description of functions for each of the at least two computer applications;
comparing the description of functions for each of the at least two computer applications;
generating a dialog between avatars representing the at least two applications based on (i) the comparing of the description of functions for each of the at least two computer applications, and (ii) a user input comprising data pertaining to a physical parameter of the user perceived by a sensor, wherein the physical parameter comprises at least one of user body temperature, user blood pressure, and electric conductivity of user skin; and
making the dialog available to a user.

22. The system of claim 21, wherein the system is networked.

23. The system of claim 21, wherein the memory stores further instructions that when executed by the processor perform the operations of:
determining a function difference between the at least two computer applications according to the description of functions; and
outputting the function difference to a natural language generation module to produce a sentence for one of the at least two computer applications.

* * * * *